United States Patent [19]

Hull

[11] 4,241,724
[45] Dec. 30, 1980

[54] METHOD AND MEANS OF PREVENTING HEAT CONVECTION IN A SOLAR POND

[75] Inventor: John R. Hull, Ames, Iowa

[73] Assignee: Iowa State University Research Foundation, Inc., Ames, Iowa

[21] Appl. No.: 953,593

[22] Filed: Oct. 23, 1978

[51] Int. Cl.³ .............................................. F24J 3/02
[52] U.S. Cl. ................................. 126/415; 126/452; 126/436; 165/45; 4/495
[58] Field of Search .............. 126/415, 426, 416, 435, 126/436, 437, 440, 452; 4/172.12, 172.13, 172.14; 165/1, 2, 45, 485; 203/DIG. 1; 60/641

[56] References Cited

U.S. PATENT DOCUMENTS

| | | | |
|---|---|---|---|
| 3,933,628 | 1/1976 | Varani | 126/415 |
| 4,056,094 | 11/1977 | Rosenberg | 126/440 |
| 4,079,726 | 3/1978 | Voelker | 126/415 |
| 4,085,999 | 4/1978 | Chahroudi | 126/450 |
| 4,091,800 | 5/1978 | Fletcher et al. | 126/415 |

FOREIGN PATENT DOCUMENTS

| | | | |
|---|---|---|---|
| 1328372 | 5/1971 | United Kingdom | 126/426 |
| 308276 | 8/1971 | U.S.S.R. | 126/415 |

Primary Examiner—James C. Yeung
Assistant Examiner—Larry Jones
Attorney, Agent, or Firm—Zarley, McKee, Thomte, Voorhees & Sease

[57] ABSTRACT

A method and means of preventing heat convection in a solar pond is disclosed with the means comprising a liner element adapted to cover the sides and floor of a solar pond with the liner element having a bottom portion corresponding to the floor of the pond and side portions corresponding to the sides of the pond and a plurality of membrane elements extending between the sides of the liner element and sealably connected thereto so as to form a plurality of liquid layers with each said layer being fluidly sealed from the immediate adjacent layers and the membrane elements being of a transparent film material. The method of preventing heat convection comprises providing a body of liquid supported on a bottom support surface and having a closed periphery and upper surface, providing a plurality of closely spaced horizontal membranes in the body of liquid with the membranes being a transparent film material, sealing each membrane at the periphery of the body of liquid to prevent migration of liquid upwardly past the membranes, imposing a closed conduit through the liquid adjacent one of the lowermost membranes, and moving a fluid through the conduit whereby the fluid will absorb heat from the liquid by conduction through the conduit.

An alternate embodiment of the means for preventing convection is disclosed comprising a liner element and a membrane element extending between the sides of the liner element and sealably connected to the liner element with the membrane adapted to form an upper insulating layer and a plurality of solution filled capsules adapted for dispersion within the insulating layer with the capsules and the solution being transparent.

16 Claims, 4 Drawing Figures

METHOD AND MEANS OF PREVENTING HEAT CONVECTION IN A SOLAR POND

BACKGROUND OF THE INVENTION

This invention relates to solar ponds and more particularly to a method and means of preventing convection of heat in a solar pond. In utilizing a solar pond, it is necessary to suppress or eliminate the upward convection of hot water from the bottom of the pond to the upper pond surface. Such convection allows the inefficient dissipation of heat energy to the atmosphere. Prior solar ponds utilized a salt-gradient to suppress convection. In a salt gradient solar pond, the higher salt concentration at the bottom of the pond makes the hot salty water heavier than the cooler less salty water above it. Convection is thereby suppressed creating a stagnant insulating layer where the destabilizing temperature gradient is overbalanced by the stabilizing salt gradient. Salt gradient solar ponds, however, suffer from two major deficiencies. First, the salt gradient must be maintained as the salt will slowly diffuse to the surface, diminishing the gradient. Also it is possible for outside disturbances to start convecting regions within the insulating layer which seriously decreases the insulating value. Second, salt gradient solar ponds require a lot of salt to maintain stability. Leaks and overflows, as well as pond decommissionings, are potential local and environmental disturbances due to the large amount of salt involved.

SUMMARY OF THE INVENTION

A method and means of preventing heat convection in a solar pond is disclosed with the means comprising a liner element adapted to cover the sides and floor of a solar pond with the liner element having a bottom portion corresponding to the floor of the pond and side portions corresponding to the sides of the pond, and a plurality of membrane elements extending horizontally between the sides of the liner element and sealably connected to the liner to form a plurality of liquid layers with each layer being fluidly sealed from the immediate adjacent layer and with the membrane elements being a transparent film material. The membrane elements have an index of refraction substantially the same as the index of refraction of the liquid in the solar pond and these elements are detachably secured to the sides of the liner by means of a retentive channel member attached to the liner and extending around the solar pond with the channel member retentively detachably receiving a ridge portion extending about the outer periphery of the membrane elements.

The method of preventing heat convection in a solar pond comprises providing a body of liquid supported on a bottom support surface and having a closed periphery and upper surface, providing a plurality of closely spaced horizontal membranes in the body with the membranes being of a transparent film material, sealing each membrane at the periphery of the body of liquid to prevent migration of liquid upwardly past the membranes so that liquid heated by the sun underneath the lowermost membranes will not move upwardly past any membrane, imposing a closed conduit to the liquid adjacent one of the lowermost membranes and moving a fluid through the conduit so that the fluid will absorb heat from the liquid by conduction through the conduit.

An alternate embodiment comprises a liner element adapted to cover the sides and floor of a solar pond with the liner element having a bottom portion corresponding to the floor of the solar pond, and side portions corresponding to the sides of the solar pond, a membrane element extending between the sides of the liner element and sealably connected to the liner with the membrane adapted to form an upper insulating layer of pond liquid and a lower convecting layer of pond liquid with each layer being fluidly sealed from the other, and a plurality of capsules filled with solution and adapted for dispersion within the insulating layer. The capsules and the solution are transparent with an index of refraction substantially the same as the index of refraction of the pond liquid.

It is a principal object of this invention to provide an improved method for preventing convection of heat in a solar pond.

A still further object of the invention is to provide an improved means for preventing convection of heat in a solar pond.

A still further object of the invention is to provide a method and means of preventing convection of heat in a solar pond that does not require maintenance of a particular chemical composition of the solar pond.

A still further object of the invention is to provide a method and means of preventing heat convection in a solar pond that is environmentally safe.

A still further object of the invention is to provide a method and means of preventing convection of heat in a solar pond to accomplish long term storage of heat.

A still further object of the invention is to provide a method and means of preventing convection of heat in a solar pond that maximizes penetration of incoming solar radiation.

A still further object of the invention is to provide a means for preventing heat convection in a solar pond that requires no maintenance and virtually no replacement of elements.

A still further object of the invention is to provide a means for preventing convection of heat in a solar pond wherein the pond is stratified by a plurality of transparent membranes having the same index of refraction as the pond liquid.

A still further object of the invention is to provide a means for preventing heat convection in a solar pond that is economical to manufacture, durable in use and refined in appearance.

DESCRIPTION OF THE PREFERRED EMBODIMENT

Figure 1:
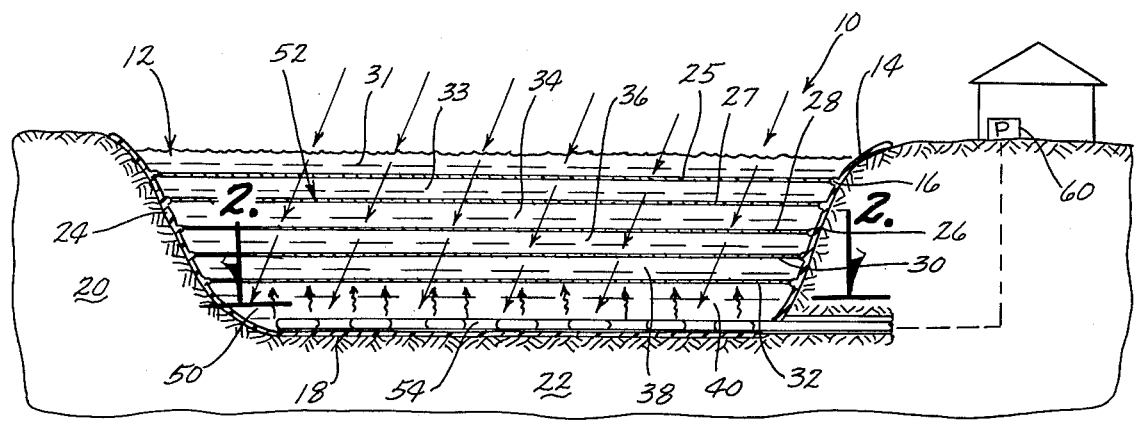
FIG. 1 is a sectional side view of the present invention within a solar pond.

The numeral 10 generally refers to the apparatus for preventing heat convection in solar pond 12 as shown in FIG. 1.

Apparatus 10 is generally comprised of liner element 14 having side portion 16 and bottom portion 18 adapted to cover and correspond to the side 20 and floor 22, respectively, of pond 12. The opposing portions of side 16 shown in the sectional view of FIG. 1 will be referred to for purposes of explanation as left side portion 24 and right side portion 26. However, it is understood that side 16 of liner element 14 is an integral structure corresponding to the integral nature of wall 20 of pond 12. Also for purposes of explanation, pond 12 is considered to be a fresh water solar pond, although other liquids besides water can be utilized and the present invention is capable of functioning in these other liquids.

Figures 3, 4:
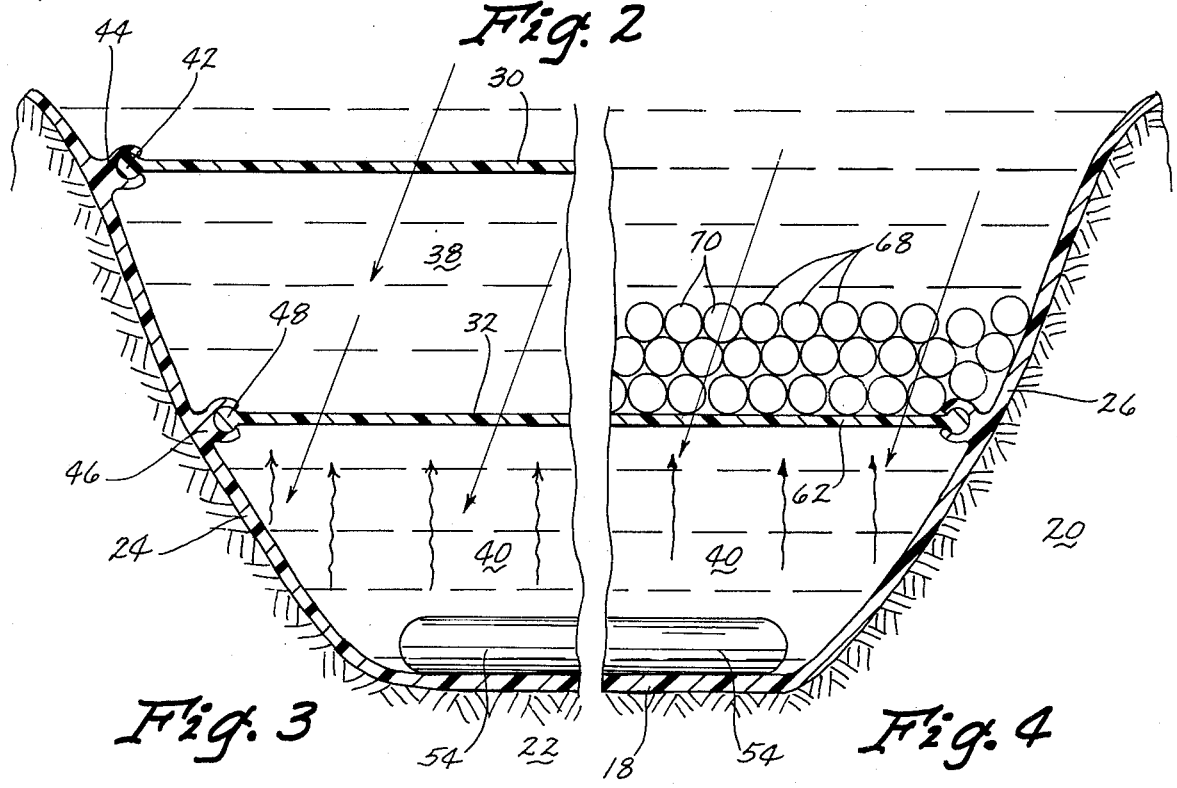
FIG. 3 is an enlarged partial sectional view of FIG. 1.
FIG. 4 is a sectional side view of the alternate embodiment of this invention.

A plurality of thin transparent membranes 28, 30, 32 (FIG. 1) extend between side portions 24 and 26 in generally horizontal disposition. While five membranes are shown in FIG. 1, it has been found that the number of membranes required for utilization of this method varies with the specific application, e.g., high temperature heat retention or low temperature heat retention, and with the particular liquid utilized in the solar pond, e.g., low viscosity or high viscosity liquid. The membranes sealably engage the liner element 14 to stratify the pond 12 and form a plurality of liquid layers 31, 33, 34, 36, 38 and 40 with each layer being sealed from the immediate adjacent layer. Thus, there is no fluid communication between adjacent liquid layers. The membranes are detachably secured to the liner element 14 by a channel-ridge arrangement shown in FIG. 3. Membrane element 30 has a ridge portion 42 extending around its outer peripheral edge to be retentively detachably received by a corresponding channel member 44 attached to and extending around the inner peripheral surface of liner element 14. In a likewise manner, membrane 32 is detachably connected to liner 14 by channel member 46 receiving ridge portion 48 (FIG. 3). Membranes 25, 27 and 29 are attached in the same manner.

The region below the lowermost membrane 32 is referred to as the convecting layer 50 while the whole portion above membrane 32 is referred to as the insulating layer 52 which comprises the remaining plurality of membrane elements and interposed liquid layers.

The thin transparent membrane elements are preferably of plastic material to allow passage of solar radiation. It is necessary that an adequate amount of incident solar radiation be transmitted through the insulating layer 52 to the convecting layer 50 where it can be absorbed and stored. Some of the transmission of solar radiation is lost due to the absorption of light by the membrane. The majority of loss is from the Fresnel reflection due to the difference between the indices of refraction of the membrane elements and the liquid. By choosing a membrane element having an index of refraction similar to the index of refraction of the solar pond liquid, this loss can be greatly reduced or eliminated. A preferable membrane material for use with water is Teflon made by duPont as Teflon has approximately the same refractive index as water and absorbs little radiation in the visible region. Reflection losses between the membrane and the water could be lessened further by adding a chemical to the water that would raise the water's index of refraction somewhat. Alternatively, the index of refraction of the membrane could be lower by additives to produce such an effect.

It has been found that a minimum of three membranes is required for lower temperature applications of this method and/or use with a high viscosity pond liquid. Fifty membranes are necessary for high temperature heat retention (80°–100° C.). Spacing requirements between membranes also varies with application and pond liquid viscosity. For high temperature retention and fresh water, the preferable membrane spacing is between one-half to one inch with an overall vertical distance of horizontally spaced membranes being approximately four feet. Low temperature applications and/or high viscosity liquids would require spacing of approximately one foot.

An alternate configuration would be to utilize a membrane of ordinary clear plastic having an index of refraction of 1.45–1.50 together with a pond liquid of a highly concentrated sugar solution. The sugar solution substantially increases the index of refraction of the solution and the viscosity. In addition to matching the index of refraction of the liquid to that of the membrane, the sugar acts as a thickening agent. A higher viscosity of liquid reduces convection between membranes to further reduce transfer of heat upwardly and thereby reduces the number of membranes necessary to support a given temperature gradient.

Figure 2:
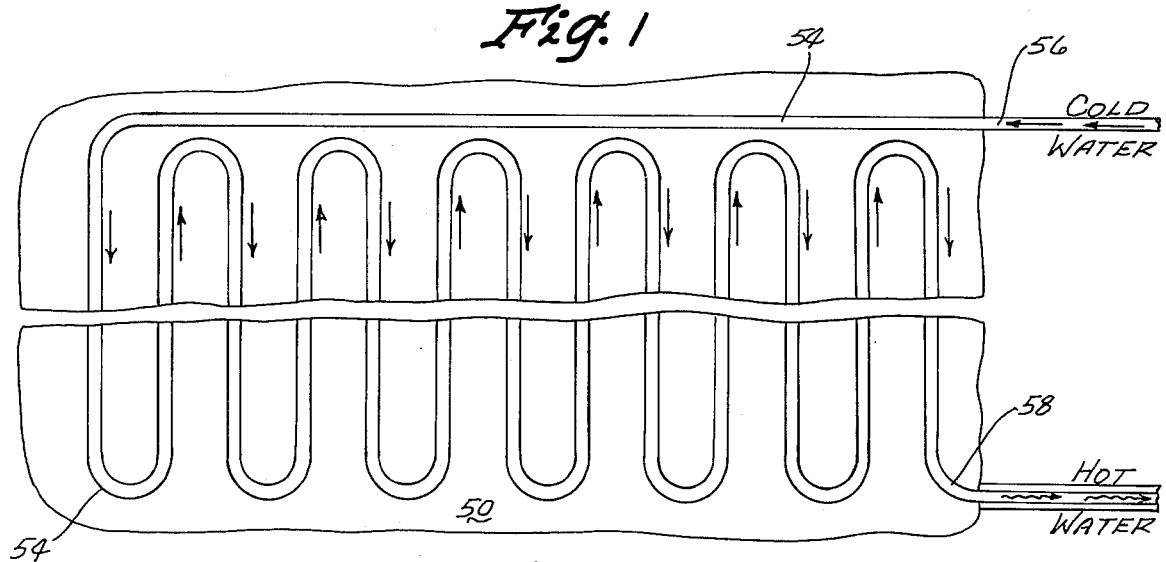
FIG. 2 is an enlarged partial top view seen on line 2—2 of FIG. 1.

The heat absorbed in the convecting layer 50 may be removed therefrom by disposing a closed conduit 54 in sinusoidal fashion within the convecting layer 50 as shown in FIG. 2. Moving a fluid through conduit 54 will allow the fluid to absorb the heat from the water of the convecting layer 50 by conduction. Cold water enters the inlet end 56 of conduit 54 and becomes heated as it travels through the sinusoidal configuration and exits from outlet end 58 as hot water. A pump means 60 is utilized to pump the fluid through conduit 54.

In operation, the membrane stratified solar pond greatly reduces the convective heat loss. Each membrane sealably separates two liquid levels so that while convection may occur within each individual layer, convection heat loss will not propagate upwardly to the surface. The less dense hot water at the bottom of the solar pond is unable to convect upwardly past the individual membranes and therefore heat can only escape via conduction. In other words, the water will convect energy between the membranes but heat transfer is reduced by the large number of membrane to liquid interfaces. Convective heat transfer may be further reduced if each membrane is formed into cellular honeycombs or other convection reducing geometric designs as is often utilized in flat plate air collectors.

The membrane stratified solar pond needs no maintenance as liquid is allowed to convect between the respective membranes and requires virtually no replacement. While other liquids besides water can be used, it is important to match the index of refraction of the liquid to the index of refraction of the membrane.

The stratified solar pond comprised of apparatus 10 and pond 12 can be used for space heating, domestic hot water heating and low temperature industrial heating applications. It also has applications as a swimming pool heater. For example, when the pool was not being used for swimming, a membrane structure can be easily inserted by means of the ridge-channel arrangement previously described for heating up the pool in the day time and insulating it at night. The membrane structure is then easily removed when swimming is desired.

An alternate embodiment for preventing heat convection in a solar pond is shown in FIG. 4. As seen in FIG. 4, a single membrane element 62 is horizontally disposed between side portions 24 and 26. In a manner similar to the embodiment of FIG. 1, membrane element 62 sealably engages liner element 14 to form an upper insulating layer 64 and a lower convecting layer 66. Instead of a series of membranes, an array of capsules 68 filled with solution 70 are placed within the upper insulating layer 64 to prevent heat convection on the insulating layer. The capsule material is transparent and preferably has an index of refraction substantially close to that of the pond liquid. The capsule material and solution 70 together should preferably be denser than the pond liquid so that the capsules do not float to the extent of being pushed out of the insulating layer 64.

The solution 70 is also transparent and has preferably an index of refraction similar to that of the pond liquid but need not be the same as the pond liquid. For example, capsules made of Teflon and containing water could be utilized in the insulating layer. The capsule 68 may be of any shape. Again, chemical additives may be utilized to adjust the index of refraction of the liquid in the insulating layer 64 to match the index of refraction of the capsules.

In operation of any solar pond, a high convecting layer temperature establishes a large temperature gradient across the insulating layer 64 and across the wall 20 of the pond which causes a large heat loss from the pond to the environment. A desirable method of limitating these parasitic heat losses is to keep the temperature of the pond as low as possible. The ideal maximum temperature of the pond is that which is adequate to supply heat to the thermal load. Once the pond convecting layer achieves this ideal temperature, it is desirable that additional energy input to the pond be stored in such manner so as to not raise the convecting layer temperature above this point. A preferred way to maintain this temperature and remove the excess energy is to place a phase change element (not shown) comprised of a phase change material in the convecting layer 66. The phase change material is designed to change phase at the ideal pond temperature. This prevents the pond from exceeding the ideal temperature, decreases parasitic heat losses, and increases the efficiency of the solar pond. After the phase change material has absorbed its maximum amount of heat, i.e., after all the material has changed phase in a given unit, it may then be withdrawn from the pond and replaced with another phase change unit. Once the phase change unit has absorbed its maximum amount of heat, it may be transported long distances from the solar pond to be used for heating functions.

Thus, it can be seen that this device accomplishes at least all of its stated objectives.

What is claimed is:

1. A method of preventing convection of heat in a fresh water solar pond, comprising,
   providing a body of fresh water supported on a bottom support surface and having a closed periphery and an upper surface,
   providing at least three closely spaced horizontal membranes in said body of water; said membranes being a transparent film material,
   sealing each membrane at the periphery of said body of water to prevent migration of water upwardly past said membranes, whereby water heated by the sun underneath the lowermost membranes will not move upwardly past any membrane,
   imposing a closed conduit through the water adjacent one of the lowermost membranes whereby said water will not have access to the interior of said conduit,
   and moving a fluid through said conduit whereby said fluid will absorb heat from said water by conduction through said conduit,
   the index of refraction of said membranes being substantially that of said water.

2. The method of claim 1 wherein said membranes are spaced from one another by between one-half and one inches.

3. The method of claim 2 herein the number of membranes is approximately 50.

4. The method of claim 3 wherein said plurality of closely spaced horizontal membranes encompass a vertical distance of approximately four feet.

5. The method of claim 1 wherein the material of said membranes is Teflon.

6. A method of preventing convection of heat in a solar pond, comprising,
   providing a body of liquid supported on a bottom support surface and having a closed periphery and an upper surface,
   providing at least one horizontal membrane in said body of liquid to divide said body of liquid into an upper insulating layer and a lower convecting layer; said membrane being a transparent film material,
   sealing said membrane at the periphery of said body of liquid to prevent migration of liquid upwardly past said membrane, whereby liquid heated by the sun underneath said membrane will not move upwardly past said membrane, and
   providing an array of solution-filled capsules within said upper insulating layer, said capsule material and said solution being transparent and said solution being denser than the pond liquid so that said capsules are submerged within said upper insulating layer,
   the index of refraction of said capsules and said solution being substantially that of said liquid.

7. The method of claim 6 wherein the material of said capsules is Teflon.

8. The method of claim 6 wherein said liquid is fresh water.

9. An apparatus for preventing heat convection in a solar pond, comprising,
   a liner element covering the sides and floor of a solar pond, said liner element having a bottom portion corresponding to the floor of the solar pond and side portions corresponding to the sides of the solar pond, and
   at least three membrane elements extending horizontally between said sides of said liner element and sealably connected to said liner to form a plurality of liquid layers within said solar pond, each said layer being fluidly sealed from the immediate adjacent layers,
   said membrane elements being a transparent film material having an index of refraction substantially the same as the index of refraction of the liquid of the solar pond.

10. The device of claim 11 wherein said membrane elements are detachably secured to said sides by attachment means.

11. In combination,
    means for removing heat from a solar pond of liquid having a convection portion, and
    an apparatus for preventing heat convection in said solar pond, comprising,
    a liner element covering the sides and floor of said solar pond, said liner element having a bottom portion corresponding to the floor of said pond and side portions corresponding to the sides of said pond, and at least three membrane elements extending in horizontal disposition between said sides of said liner element and sealably connected to said liner element to form a plurality of layers of said liquid, each said layer being fluidly sealed by a respective membrane from the immediate adjacent layer, each said membrane being a transparent film material, the layer of liquid below the lowermost membrane being said convection portion with said means for removing heat being located within said convection portion, the index of refraction of said membrane elements being substantially that of said liquid.

12. The combination of claim 11 wherein said means for removing heat from said solar pond comprises a closed conduit extending through said convection portion and means for pumping a second liquid through said conduit so that the second liquid will absorb heat from said liquid of said solar pond by conduction through said conduit.

13. The combination of claim 11 wherein said means for removing heat from said solar pond is a phase change element comprised of phase change material.

14. The combination of claim 11 wherein said liquid is water.

15. The combination of claim 14 wherein said liquid is a sugar solution.

16. An apparatus for preventing heat convection in a solar pond, comprising, a liner element covering the sides and floor of a solar pond, said liner element having a bottom portion corresponding to the floor of the solar pond and side portions corresponding to the sides of the solar pond, a membrane element extending between said sides of said liner element and sealably connected to said liner, said membrane forming an upper insulating layer of pond liquid and a lower convecting layer of pond liquid, said insulating layer being fluidly sealed from said convecting layer, and a plurality of capsules filled with a solution and dispersed within said insulating layer, said capsules and said solution being transparent and said solution being denser than the pond liquid so that said capsules are submerged within said upper insulating layer, the index of refraction of said capsules and said solution is substantially that of the pond liquid.

* * * * *